United States Patent [19]

Bowman

[11] Patent Number: 5,160,696
[45] Date of Patent: Nov. 3, 1992

[54] APPARATUS FOR NUCLEAR TRANSMUTATION AND POWER PRODUCTION USING AN INTENSE ACCELERATOR-GENERATED THERMAL NEUTRON FLUX

[75] Inventor: Charles D. Bowman, Los Alamos, N. Mex.

[73] Assignee: The United States of America as represented by the United States Department of Energy, Washington, D.C.

[21] Appl. No.: 560,900

[22] Filed: Jul. 17, 1990

[51] Int. Cl.$^5$ .............................................. G21G 1/02
[52] U.S. Cl. .................................. 376/189; 376/195; 376/170
[58] Field of Search ............................. 376/189–195, 376/170–172, 156, 158, 354–360

[56] References Cited

U.S. PATENT DOCUMENTS

| | | | |
|---|---|---|---|
| 3,216,901 | 11/1965 | Teitel | 376/359 |
| 3,325,371 | 6/1967 | Stanton . | |
| 3,349,001 | 10/1967 | Stanton . | |
| 3,453,175 | 7/1969 | Hodge . | |
| 3,778,627 | 12/1973 | Carpenter . | |
| 4,309,249 | 1/1982 | Steinberg et al. . | |
| 4,721,596 | 1/1988 | Marriott et al. | 376/189 |

FOREIGN PATENT DOCUMENTS

98600  4/1988  Japan ................................. 376/158

OTHER PUBLICATIONS

H. Takada et al., "A Conceptual Study of Actinide Transmutation System with Proton Accelerator," proceedings of the 2nd International Symposium held on Jan. 24–26, Mito, Ibaraki, Japan.
Kazuo Furukawa et al., "Accelerater Molten–Salt Breeding and Thorium Fuel Cycle," proceedings of the 2nd International Symposium held on Jan. 24–26, Mito, Ibaraki, Japan.
F. Atchison et al., "Status Report of the SIN Neutron Source," proceedings of the International Collaboration on Advanced Neutron sources held on Sep. 13–16, 1983, Atomic Energy of Canada, Limited, Report AECL–8488.
"Preliminary Design and Neutronic Analysis of a Laser Fusion Driven Actinide Waste Burning Hybrid Reactor", Berwald et al., Nuclear Technology, vol. 42, Jan. 1979, pp. 34–50.
"Intense Neutron Sources", U.S. Atomic Energy Commission, COMF–660925, Sep. 1966, pp. 651–652.

Primary Examiner—Brooks H. Hunt
Assistant Examiner—Frederick H. Voss
Attorney, Agent, or Firm—Samuel M. Freund; Paul D. Gaetjens; William R. Moser

[57] ABSTRACT

Apparatus for nuclear transmutation and power production using an intense accelerator-generated thermal neutron flux. High thermal neutron fluxes generated from the action of a high power proton accelerator on a spallation target allows the efficient burn-up of higher actinide nuclear waste by a two-step process. Additionally, rapid burn-up of fission product waste for nuclides having small thermal neutron cross sections, and the practicality of small material inventories while achieving significant throughput derive from employment of such high fluxes. Several nuclear technology problems are addressed including 1. nuclear energy production without a waste stream requiring storage on a geological timescale, 2. the burn-up of defense and commercial nuclear waste, and 3. the production of defense nuclear material. The apparatus includes an accelerator, a target for neutron production surrounded by a blanket region for transmutation, a turbine for electric power production, and a chemical processing facility. In all applications, the accelerator power may be generated internally from fission and the waste produced thereby is transmuted internally so that waste management might not be required beyond the human lifespan.

60 Claims, 4 Drawing Sheets

RFQ Radio-Frequency Quadrupole
DTL Drift-Tube Linac
CCL Coupled-Cavity Linac

APPARATUS FOR NUCLEAR TRANSMUTATION AND POWER PRODUCTION USING AN INTENSE ACCELERATOR-GENERATED THERMAL NEUTRON FLUX

BACKGROUND OF THE INVENTION

The present invention relates generally to a resolution of the waste problem associated with the various fission-based technologies by waste transmutation using an accelerator-generated intense thermal neutron flux, and more particularly to the reduction in the period for management of existing commercial and defense nuclear waste to a time period comparable to the human lifespan and allows future production of nuclear power and material without generation of wastes requiring long term storage. The apparatus has significant operational safety advantages over existing technology since it operates well below nuclear criticality and with a greatly reduced inventory of radioactive nuclear material. The United States Government has rights in this invention pursuant to Contract No. W-7405-ENG-36 between the Department of Energy and the University of California.

Present nuclear waste strategies, centered about geologic repository storage, require geologic stability and separation of wastes from human contact for tens of thousands of years. Transmutation offers the potential for transforming the time scales associated with such storage to hundreds of years or less.

Transmutation of long-lived nuclear wastes to short-lived or stable isotopes has been studied for many years. A sampling of illustrative techniques was presented in a recent symposium in a presentation entitled "A Conceptual Study Of Actinide Transmutation System With Proton Accelerator(1) Target Neutronics Calculation," by H. Takada, I. Kanno, T. Takizuka, T. Ogawa, T. Nishida, and Y. Kaneko, Proceedings Of The 2nd International Symposium On Advanced Nuclear Energy Research-Evolution By Accelerators, January 24-26, 1990, Mito, Ibaraki, Japan. The authors describe a transmutation apparatus using keV neutrons which requires large material inventories to achieve significant transmutation rates since cross sections for neutron capture are small at these neutron energies. Moreover, the proton beam is admitted to the subcritical reactor target using a window, which limits the neutron flux available for the process. The direct interaction between the proton beam and the sodium coolant will produce substantial quantities of oxygen, carbon, nitrogen, and hydrogen spallation products, which may combine to generate tar. Finally, degradation of the cladding material for the nuclear waste as a result of proton bombardment may present a lifetime problem. In "Accelerator Molten-Salt Breeding And Thorium Fuel Cycle," by Kazuo Furukawa, Yasuaki Nakahara, Yoshio Kato, Hideo Ohno, and Kohshi Mitachi, Proceedings Of The 2nd International Symposium On Advanced Nuclear Energy Research-Evolution By Accelerators, January 24-26, 1990, Mito, Ibaraki, Japan, the authors describe a windowless apparatus accepting high proton beam currents having GeV energies which are caused to impinge directly on the target materials as in the Takada et al. reference except cooled by molten salt. Transmutation is achieved using keV neutrons where the low cross sections of the neutrons require large inventories to achieve useful transmutation throughput. Additionally, since the thorium is mixed with lithium fluoride, proton spallation will again produce bothersome tars.

In "Status Report Of The SIN Neutron Source," by F. Atchison and W. E. Fischer, Proceedings Of International Collaboration On Advanced Neutron Sources (ICANS-VII), Sep. 13-16, 1983, Atomic Energy Of Canada, Limited, Report AECL-8488, the authors disclose a low-power target for low flux neutron production in Pb-Bi from neutron bombardment with subsequent neutron thermalization using heavy water. Heat is removed from the target by thermal convection, and the low power levels also permit the use of a window between the accelerator vacuum and the target. The proton beam strikes the target from below which has advantages for the thermal convection cooling.

Accordingly, it is an object of the present invention to efficiently transmute higher actinides and other nuclear wastes.

Another object of my invention is to generate power from fertile materials while transmuting the fission and other waste in order to avoid long-term storage.

Yet another object of the present invention is to generate tritium drawing on an external electric power source, and without generation of waste requiring long-term storage.

SUMMARY OF THE INVENTION

To achieve the foregoing and other objects and in accordance with the purpose of the present invention, as embodied and broadly described herein, the apparatus for generating power from fertile nuclear materials and transmuting wastes therefrom to less radioactive species may include a source of high intensity, high-energy beam of protons, a liquid-metal spallation target having an upwardly facing open surface for producing a high neutron flux upon being impacted by high-energy protons, a substantially gas-tight enclosure surrounding the spallation target, windowless apparatus for directing the beam of protons onto the open surface of the spallation target, a neutron moderator for thermalizing neutrons generated from the spallation target, a container for holding fertile nuclear material located within the neutron moderator and spaced apart from and outside of the spallation target, and a container for holding materials to be transmuted located within the neutron moderator and spaced apart and outside of the spallation target, yet closer thereto than the fertile nuclear material container.

In another aspect of the present invention, in accordance with its objects and purposes, the apparatus for transmuting higher actinide waste along with $^{99}$Tc, $^{129}$I, and other fission product waste may include a source of high intensity, high-energy of protons, a liquid-metal spallation target having an upwardly facing open surface for producing a high neutron flux upon being impacted by high-energy protons, a substantially gas-tight enclosure surrounding the spallation target, windowless apparatus for directing the beam of protons onto the open surface of the spallation target, a neutron moderator for thermalizing neutrons generated from the spallation target, and a container for holding the material to be transmuted located within the neutron moderator and spaced apart from and outside of the spallation target.

In yet another aspect of the present invention, in accordance with its objects and purposes, the apparatus for simultaneously transmuting higher actinide materials and producing tritium may include: a source of high intensity, high-energy protons, a liquid-metal spallation target having an upwardly facing open surface for producing a high neutron flux upon being impacted by high-energy protons, a substantially gas-tight enclosure surrounding the spallation target, windowless apparatus for directing the beam of protons onto the open surface of the spallation target, a neutron moderator for thermalizing neutrons generated from the spallation target, a container for holding the higher actinide materials located within the neutron moderator and spaced apart from and outside of the spallation target, and a container located within the neutron moderator and spaced apart from the spallation target for holding materials which generate tritium upon interaction with neutrons.

Benefits and advantages of the present invention include power production from $^{238}$U, $^{232}$Th, and from burning defense and commercial higher actinide waste without long-term waste management, avoiding long term management of commercial spent fuel by fission product transmutation using $^{239}$Pu from reprocessing tritium production while burning higher actinide waste, $^{238}$U and $^{232}$Th. Another benefit of the present invention includes the avoidance of the major problem of current nuclear reactors which is catastrophic runaway. Since the fission products can be continually removed from the molten salt stream and the inventory of fissile material is small, the probability and consequences of a loss-of-coolant accident also are significantly reduced. The probability of such an accident is greatly reduced since this system operates well below nuclear criticality and requires no control rods.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings.

DETAILED DESCRIPTION OF THE INVENTION

Figure 1:
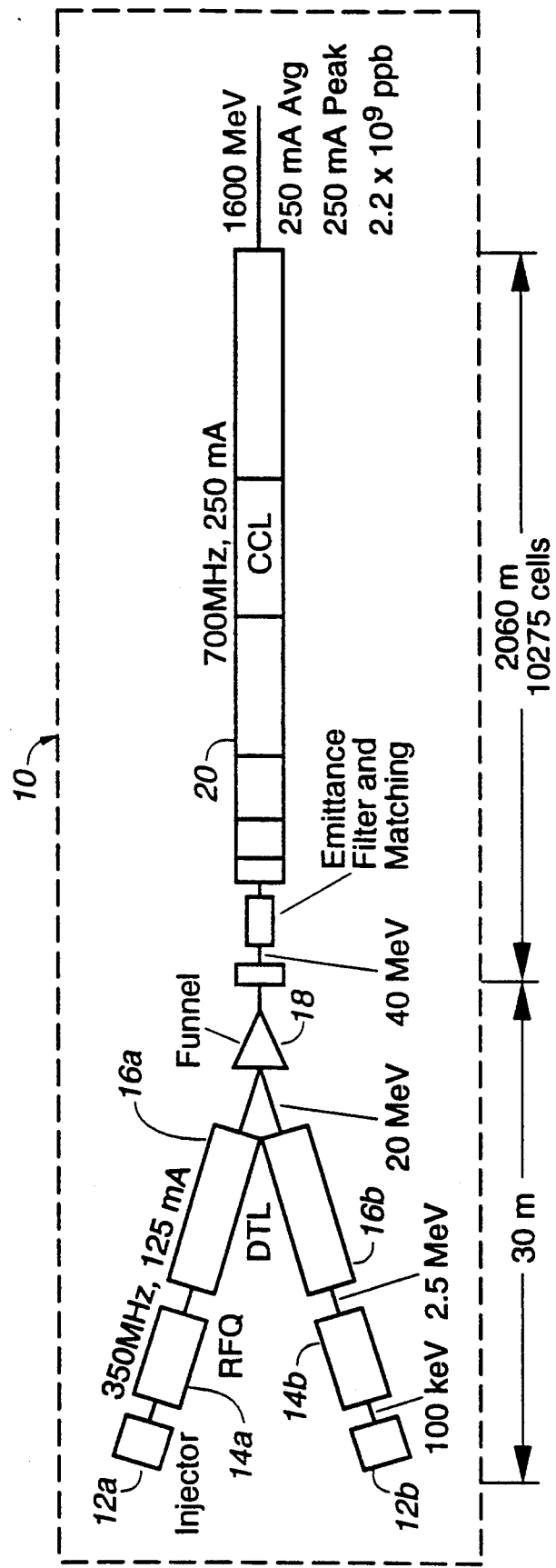
FIG. 1 is a schematic representation of the proton accelerator which would provide high intensity, high-energy protons to a target in order to generate intense neutron fluxes.

Recent advances in high-energy high current accelerator design permit high intensity sources of low-energy neutrons based on accelerator-driven neutron spallation to be envisioned. Fluxes of about one hundred times greater than those found in standard nuclear reactor designs allow higher actinides such as neptunium-237 to be converted rapidly. This can only occur in a high flux environment where resulting daughter products are fissioned rapidly. Intense fluxes of low-energy neutrons also permit the rapid conversion of long-lived fission products such as technetium-99 which have small neutron cross sections. Additionally, although the apparatus of the present invention is expected to achieve yearly amounts of transmuted materials which are similar to that from nuclear reactors or conventional accelerator-based concepts, my invention requires less than one-hundredth of the resident actinide or fission product materials than conventional apparatus.

Nuclear wastes are comprised of a relatively few radioactive materials that cause most of the waste handling problems. Within this group are long-lived species having half-lives of 10,000 to 2,000,000 years made up of actinides such as neptunium-237, americium-241, and curium-244, as well as fission products such as technetium-99 and iodine-129. Additional isotopes of concern are shorter-lived species such as strontium-90 and cesium-137 which have half-lives of approximately thirty years. Nuclear wastes stored at Department of Energy sites are principally composed of such fission products with about 20% of higher actinides, while commercial nuclear wastes are made up of more equal portions of fission products and higher actinides. The defense wastes generally exist in chemically partitioned forms which is a prerequisite for introduction into a transmutation system. Commercial waste is in the form of undisturbed spent fuel.

In a transmutation-based waste management strategy, actinides and fission products must be chemically separated from bulk waste containing mostly stable and short-lived nuclear species. The isotopes recovered in this chemical processing can then be subjected to an intense accelerator-produced neutron flux having an energy spectrum optimized to produce rapid conversion rates. For fission products this means the use of low-energy (thermal) neutrons where transmutation cross sections are large. Under such conditions, the long-lived fission products technetium-99 and iodine-127 can be transmuted efficiently. Shorter lived species such as strontium-90 and cesium-137 can also, in principal, be transmuted under such conditions. However, their low reaction probabilities require intense neutron fluxes for transmutation rates to compete with rates associated with their natural decay. Finally, intense, low-energy neutron sources can transmute higher actinides efficiently, as well. Using thermal neutrons, then, a transmutation system which can efficiently handle defense wastes and commercial wastes will be described, wherein the radiotoxicity of waste material processed can be reduced to a level no greater than the natural radiotoxicity of the uranium that was consumed in producing the waste. Without transmutation, hundreds of thousands of years would be required for these radioactive materials to decay to these levels.

Beams of several nuclear particles such as protons, deuterons, alpha particles, etc. can be used to generate neutrons from a liquid-metal spallation target such as a Pb-Bi target. Without ruling out the others, it is believed that protons will be the simplest to accelerate and just as effective in the neutron generation process. A range of energies from 400 MeV to 10 GeV per nucleon would be useful, but 1.6 GeV has been selected as the most effective proton beam energy. At 1.6 GeV, effective transmutation rates according to the teachings of the present invention require average beam currents of at least 10 ma. Full-scale transmutation facilities might require average currents in excess of 250 ma.

Reference will now be made in detail to the present preferred embodiments of the invention, examples of which are illustrated in the accompanying drawings. Identical or substantially similar structure are identified with the same callouts. FIG. 1 shows a schematic representation of a 1.6 GeV, 250 ma linear accelerator 10 having an overall length of about 2090 meters intended for use in the apparatus of the present invention. It includes beam injectors 12a,b, radiofrequency quadrupoles 14a,b for bunching the proton beam and accelerating it to 2.5 MeV, drift tube linacs 16a,b in which the beam is accelerated to 20 MeV, a funnel 18 to combine two 125 ma beams in order to reach the desired current, and a coupled cavity linac 20 to take the beam to 1.6 GeV. Lower currents might be achieved by avoiding the funnel and reducing the duty factor of the system. Other accelerator technology besides the radiofrequency linac might also be employed.

Transport of the beam from accelerator to target can be achieved with existing technology, and no novel beam control or beam interruption devices need be developed. Beam loss in the accelerator and in the beam transport can be held to sufficiently low levels that remote maintenance will not be required. With routine maintenance, the primary accelerator components are expected to endure for at least thirty years. The accelerator will be designed for greater than 90% up time.

Figure 2:
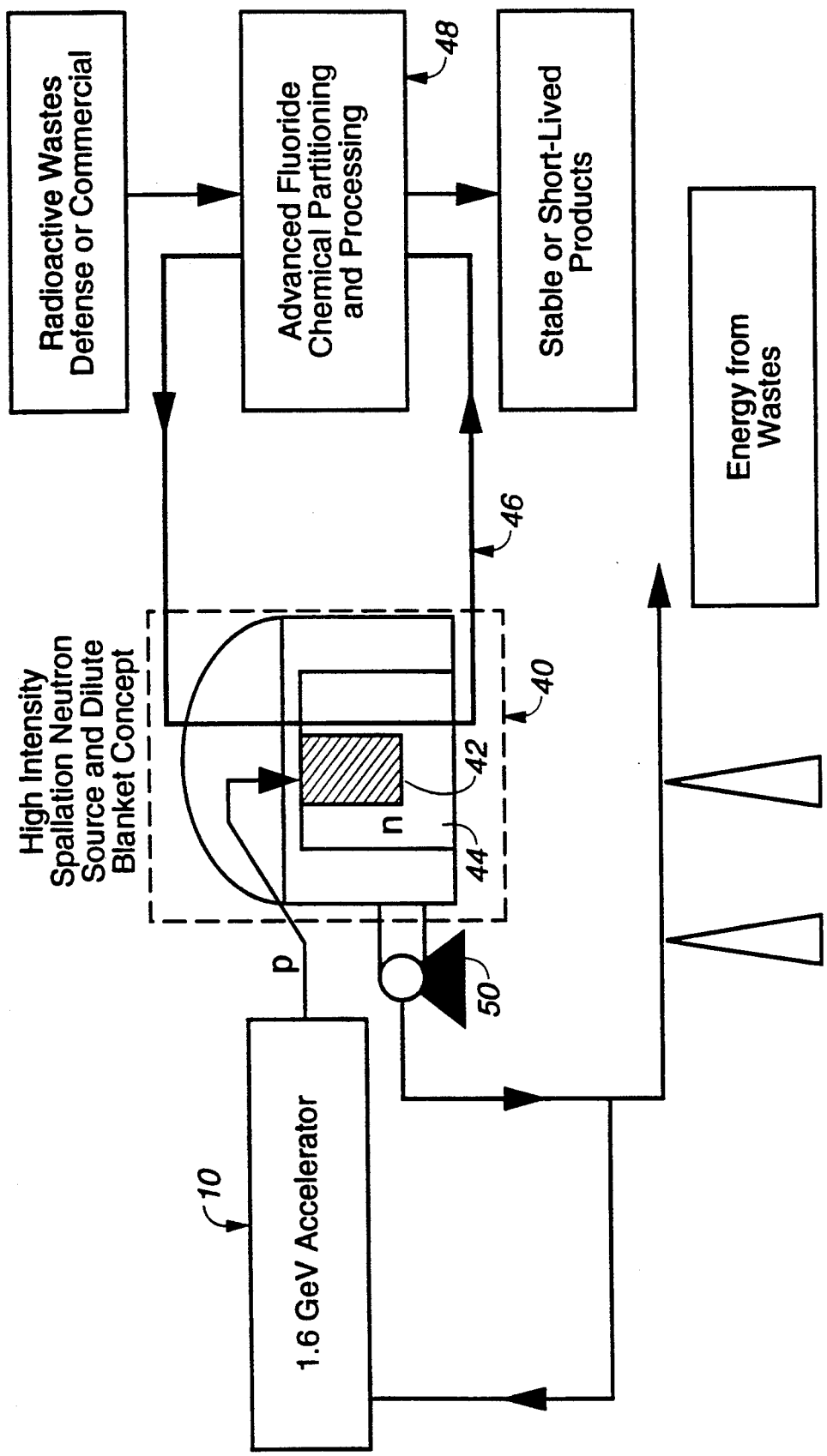
FIG. 2 is a schematic representation of the power generating, nuclear waste burning apparatus of the present invention.

FIG. 2 is a schematic representation of the apparatus of the present invention. Accelerator 10 provides a high intensity, high-energy proton beam to reaction apparatus 40. Neutrons are generated in target 42 and thermalized in moderator 44. The materials to be transmuted or fissioned are circulated through the moderator in recirculating loop 46, and the fission products separated therefrom in processor 48. Heat exchanger and electric power generation means 50 extract heat from the reaction assembly 40 and generate electricity therefrom, some of which may be used to power accelerator 10.

The advantages of employing an accelerator can be based on very simple arguments. We start with the premise, considered fundamental, that there would be no nuclear power if the average number of neutrons emitted per fission did not exceed one so that a chain reaction was possible, and that the breeder would not be possible if this number of neutrons did not exceed two. However, with the introduction of the modern high current and high efficiency accelerators, nuclear power becomes possible in principle even without the emission of neutrons in the fission process. Consider the energy cost of an accelerator-produced neutron. A 1600-MeV proton will produce about 55 neutrons upon striking a Pb-Bi target. Assuming an accelerator driven target/blanket using molten salt breeder reactor (MSBR) technology with a thermal-to-electric conversion efficiency of 44% and the expected bussbar efficiency of advanced high current accelerators of 45%, the energy cost of the neutron is $1600/(55 \times 0.45 \times 0.44) = 150$ MeV. Since 200 MeV is produced per fission, the accelerator can produce more than enough neutrons to maintain a sustained reaction rate in a fissile target such as $^{235}U$ without any fission neutron emission. The energy cost of a neutron drops to near 100 MeV if the proton beam strikes a uranium target so that even breeding is almost possible without any fission neutron emission.

Since a breeder reactor optimizes neutron economy, an argument based on the physics of the breeder is next presented. A breeder reactor operating at a breeding ratio of 1.10 generates enough neutrons to produce as much fuel as it consumes; it also produces about one extra neutron per ten fissions, which might be used for several purposes including the breeder role of generating 10% more fuel than it burns. The energy released in production of this extra medium is 2000 MeV thermal, since 200 MeV is released in each fission. Comparing this with the energy associated with accelerator-produced neutrons of 150 MeV, we see an order-of-magnitude difference. If we take only 10% of the power from the breeder and convert it to neutrons using the accelerator, we more than double the number of extra neutrons available. These extra neutrons, produced at little cost to overall nuclear power electric energy efficiency, could be used for improving the breeding ratio, transmuting nuclear waste to stable or short-lived nuclei, producing tritium, etc.

The arguments presented here center around a spallation neutron-driven target surrounded by a blanket containing material undergoing fission. Some of the blanket fission thermal energy is converted with high efficiency to electric power and used to accelerate the proton beam. An equation based on neutron economy only will now be presented which illustrates the impact of the spallation neutron process in defense and commercial nuclear energy technologies.

The rate of change of the total number of neutrons in a system dn/dt is given by $$dn/dt = S + mR_f - (1+a)R_f - C - L - U \tag{1}$$

where m is the average number of neutrons emitted per fission in the primary fissile material, $R_f$ is the total rate of fission in the system of the fissile material, and a is the capture-to-fission ratio for the fissile material. We define each of the six terms on the right hand side of Eq. 1 below:

S—the total number of spallation source neutrons introduced into the volume per second.

$mR_f$—the product of the average number of neutrons per fission times the fission rate in the system so that it is the total number of neutrons introduced into the system by fission.

$(1+a)R_f$—the number of neutrons used in the system to produce the fission from thermally fissile material. The multiplying coefficient would be unity if all neutron absorptions led to fission. However, since neutron capture is present also, the loss of neutrons must be increased by the capture-to-fission ratio a.

C—the rate of conversion of fertile material to fissile material by absorption of one neutron per converted nucleus.

L—the rate of neutron loss in the system including leakage, absorption in control rods, and neutron capture in system structural materials.

U—the rate of absorption of the remaining neutrons for useful purposes such as the burn-up of fission products.

We are only interested in the situation where the neutron production and absorption rates are balanced; i.e., dn/dt=0. We rewrite the equation then in terms of the useful neutrons as $$U = S + mR_f - (1+a)R_f - C - L \tag{2}$$

We will first illustrate the use of the equation in some well-known reactor situations (requiring S=0) and then move on to situations involving spallation neutrons, where S is non-zero.

A. NO SPALLATION NEUTRONS

1. Thorium Thermal Breeder

The MSBR developed at ORNL for breeding $^{233}$U from $^{232}$Th is one of the few successful thermal breeders. We use it as an example since our spallation system also uses molten salt as the working medium. The conversion (breeding) ratio for this system was found to be about 1.02. That is, for every $^{233}$U nucleus burned, $1.02(1+a)$ were created from the thorium. Therefore the value for $C=1.02(1+a)R_f$. Since the MSBR only barely breeds, there are no neutrons left over for any other purpose and we can then use Eq. 2 to calculate the loss term L. We have $$L/mR_f = 1 - 2.02(1+a)/m \quad (3)$$

For $^{233}$U we have $m=2.49$ and $a=0.0861$ which give $L/mR_f=0.13$. Therefore, with the greatest effort toward neutron conservation, the thermal MSBR still loses 13% to leakage, parasitic capture and to the control rods.

2. The $^{238}$U Thermal Breeder

We next consider the case of a conceptual $^{238}$U thermal breeder producing $^{239}$Pu assuming the same loss rate L and ask for a breeding ratio of only unity to determine if breeding is possible. In this case Eq. 2 becomes $$U/mR_f = 1 - 2.00(1+a)/m - 013 \quad (4)$$

For $^{239}$Pu we have $m=2.877$ and $a=0.360$ which give $U/mR_f = -0.075$. Therefore, the thermal system falls 7.5% short of the number of neutrons required for a conversion ratio of unity and we arrive at the established knowledge that a thermal $^{238}$U breeder is not practical.

3. The $^{238}$U Fast Breeder

A fast breeder works on the principle that the capture cross section drops faster than the fission cross section as the neutron energy increases into the higher keV region. Asking for a breeder with breeding ratio of 1.1, we have, referring to Eq. 4, $U/R_f=0.1$. If we assume that the loss rate for the fast breeder is the same as that for the $^{232}$Th thermal breeder and calculate a for $^{239}$Pu in the keV region, we find a 0.20 which in fact is the value measured at a neutron energy of 60 keV which is near the center of the fast neutron spectrum.

B. ADDING SPALLATION NEUTRONS

The above examples illustrate the use of the neutron economy Eq. 2 and remind us that a thermal breeder reactor alone provides essentially no excess neutrons. In this section we add in spallation neutrons and show that the addition of an accelerator makes a remarkable difference in a thermal neutron system. We will consider the case where the accelerator is being operated by electric power derived from a target/blanket containing material undergoing fission. The thermal power from the target/blanket is converted to electric power with the efficiency projected for a large MSBR (44%). We pull out a fraction f of this electric power and use it to power the accelerator, which has an overall efficiency of 45% for production of intense beams of 1.6 GeV protons. Each of these protons produces about 50 neutrons. For a fission rate $R_f$ producing 0.200 GeV per fission, we may then write the spallation source term S as $$S = R_f \times (0.2/1.6) \times 0.44 \times 0.45 \times f \times 50 = 1.24 f R_f \quad (5)$$

Substituting for S we may rewrite Eq. 2 as $$U = 1.24 f R_f + mR_f - (1+a)R_f - C - L \quad (6)$$

Using Eq. 6 we can reconsider thermal breeding and several other prospects for the accelerator-driven lead-bismuth molten salt target surrounded by a blanket with molten salt containing fissionable material, fertile material, material to be transmuted, etc.

1. Burning $^{238}$U Without Long-Term Fission Product Storage

For this example we use the neutrons to convert $^{238}$U to $^{239}$Pu with a continuous feed of $^{238}$U to the system so that the ratio of $^{239}$Pu to $^{238}$U is constant (a breeding ratio of 1.00). This corresponds to $C=(1+a)R_f$. Using the value for L established above of $L/mR_f 0.13$ for the molten salt system and the fission parameters for $^{239}$Pu we find $$U/R_f = 1.24f + m - 2(1+a) - 0.13m = 1.24f - 0.217 \quad (7)$$

If we want no excess neutrons, we solve Eq. 7 with $U/R_f=0$ and find that we can burn $^{238}$U by taking the fraction $f=0.175$ of the electrical power from the target. If we wish to burn waste fission products created from the fission of $^{239}$Pu at the rate necessary for management for a time span comparable to one human lifespan, we require $U/R_f=0.21$. This means that only $1/2 \times 21\% = 10.5\%$ of the fission products need to be transmuted in order to make practical managed storage over one human lifespan. From Eq. 7 we find $f=0.344$. The overall efficiency of the system for burning of $^{238}$U with fission product destruction is $44\% \times (1.-0.344) = 29\%$ which is not far below the electrical efficiency of commercial power reactors now on line. Therefore, the addition of the accelerator not only makes thermal burning of $^{238}$U possible but allows it to be burned with reasonable efficiency and with a waste stream which need be managed only over a human lifespan.

2. Burning $^{232}$Th Without Long-Term Fission Product Storage

The continuous circulation of the molten salt allows the $^{233}$Pa generated from neutron capture in $^{232}$Th to be separated on line before it is converted to $^{234}$U by absorbing another neutron. The $^{233}$Pa can then be burned after its beta decay to fissile $^{233}$U. We use the same equation as Eq. 7 with the parameters m and a given above for $^{233}$U. The result is $$U/R_f = 1.24f - 0.006 \quad (8)$$

Therefore to burn thorium and its fission products, we insert $U/R_f=0.21$ in Eq. 8 and find $f=0.174$. The overall efficiency for burning thorium is $44\% \times (1-0.174) = 36\%$. It is better than the efficiency for $^{238}$U because of the more favorable value for the capture-to-fission ratio for $^{233}$U. Some of this efficiency can be traded off if necessary to increased neutron loss by absorption in structural materials or simply to leakage from the system.

3. Burning the Higher Actinides Without Long Term Fission Product Storage

Figure 3:
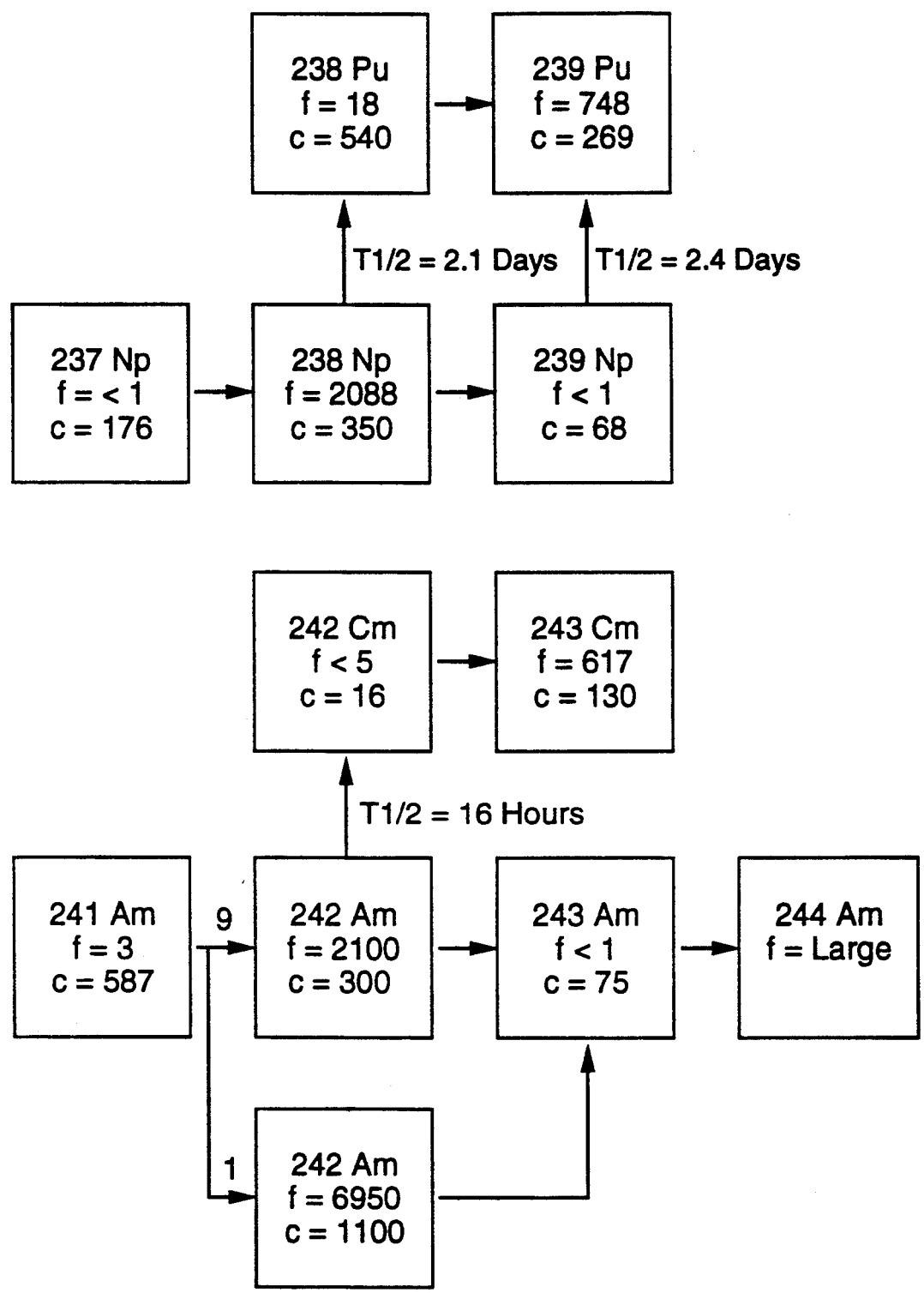
FIG. 3 illustrates the possible reaction and decay paths for $^{237}$Np and $^{241}$Am.

Managing the waste generated in either the defense or commercial sector is significantly influenced by destruction of the higher actinides by fission. The destruction of these actinides reduces the storage time for decay of waste to innocuous radioactivity levels from several hundred thousand years to several hundred years. The primary constituents in commercial waste are $^{237}$Np and $^{241}$Am, both of which normally require the absorption of at least three thermal neutrons for destruction by fission. However, in the presence of a high flux of about $10^{16}$ n/cm$^2$-s, the unstable "product" nuclides $^{238}$Np and $^{242}$Am can be burned before they decay because of their extraordinarily high fission cross sections. This is illustrated in FIG. 3 where nuclides in the transmutation path for $^{237}$Np and $^{241}$Am in a low neutron flux are shown along with fission and capture cross sections in barns denoted by f and c, respectively. For $^{237}$Np the high flux and high cross section of the product nucleus $^{238}$Np allows most of it to be destroyed by neutron-induced fission before it decays to $^{238}$Pu with its 2.1 day half-life and proceeds further up the neutron capture chain. For $^{241}$Am, 90% of the neutron captures lead to ground state $^{242}$Am which decays with a half-life of 16 hours. The remaining 10% of the captures produce the isomeric state $^{242m}$Am which has a longer half-life. Both states of $^{242}$Am have a very high fission cross section and in a high flux most will undergo destruction by fission without further neutron capture to higher mass. With the high flux the number of neutrons required for destruction of $^{237}$Np and $^{241}$Am by fission at $^{238}$Np and $^{242}$Am is substantially less than if decay allowed them to proceed farther up the neutron capture chain. In this high flux situation, the number of source neutrons required for fission is therefore reduced and an appropriately designed system will actually exhibit neutron multiplication owing to fission neutron emission.

The effectiveness of burning actinide waste may be illustrated for $^{237}$Np using Eq. 6 assuming a value for the average number of neutrons emitted per fission m of 2.70 midway between that for $^{235}$U and $^{239}$Pu. The value taken for a of 0.29 is the same as that for $^{242m}$Am, which is the only odd-odd nucleus measured. We assume that the flux is high enough that none of the $^{238}$Np decays before the second neutron absorption. We find $$U/R_f = 1.24f - 0.231 \tag{9}$$

For the burn up of the fission fragments we require excess neutrons at the rate of $U/R_f = 0.21$. Solving Eq. 9 for f, we find that the fraction 0.186 of the electric power generated must be diverted to the accelerator. The analysis indicates that higher actinide waste can be burned with the generation of electric power at an efficiency of 44%(1−0.186)=36%.

4. Burning Fission Products Using $^{239}$Pu as the Fuel

Commercial nuclear power reactors produce higher actinide "waste" which we see above can be burned with the accelerator at high efficiency without a fission product waste stream requiring long term storage. In addition, they produce fission products which can be transmuted to material which need be stored only for periods comparable to the human lifetime. The most effective way to burn the fission product waste using the accelerator would be to burn in the blanket some of the $^{239}$Pu separated from the spent fuel. The effectiveness of this can be obtained from Eq. 6 also. For this case, the conversion term is zero since the $^{239}$Pu is itself fissile material. Using the same loss term and the values for $^{239}$Pu of m=2.877 and a=0.360, we have $$U/R_f = 1.24f + 1.14 \tag{10}$$

Let us assume that we wish to burn as much fission product as possible so we set f=1 meaning that all of the target power is used to drive the accelerator. The resulting value for $U/R_f$ is 2.38 which means that 2.38 fission fragments can be burned for each fission event. We know that long term storage can be avoided if we transmute only the fraction $U/R_f = 0.21$ of the fission fragments Therefore, if we use the accelerator to drive a $^{239}$Pu fueled system, we can transmute the fission product waste at the ratio of 2.38/0.21=11.3. That is, one accelerator/target system could transmute the fission products from 11.3 commercial power reactors operating at the same power level.

5. Tritium Production While Burning Actinide Waste

We have seen above that, with an accelerator, higher actinide waste can be burned with enough margin to allow for burning of the fission products produced in the fission of the actinides and at the same time to allow the generation of electric power at an overall efficiency perhaps as high as 36%. Let us consider the production of tritium by burning the high actinide defense waste with all of the fission power being converted to electric power for driving the accelerator. Using Eq. 9 with f=1, we find $U/R_f = 1.01$. One neutron is produced for transmutation for every higher actinide waste nuclide which undergoes fission. For an accelerator-driven target operating at a power level of 3000 MWT, the fission rate (and therefore the useful neutron production rate) is $9.4 \times 10^{19}$/s. This translates to a tritium production rate of 12 kg/yr if each neutron is absorbed on $^3$He or $^6$Li. This prospect allows for the production of a substantial amount of tritium while burning defense program higher actinide waste, transmuting the fission products resulting from fission of the higher actinide waste so as to avoid long term storage, and performing these functions without drawing power from the commercial grid. An inspection of Eq. 7 reveals that the same tritium production rates can be produced by burning $^{238}$U if all blanket power is returned to the accelerator. Consideration of Eq. 8 shows that the tritium production rate using $^{232}$Th as fuel is more effective than $^{238}$U by about 25% since the value of a for $^{233}$U is more favorable than that for $^{239}$Pu.

Having generally described the invention, the following examples are intended to more particularly illustrate specific features thereof.

EXAMPLE I

Figure 4:
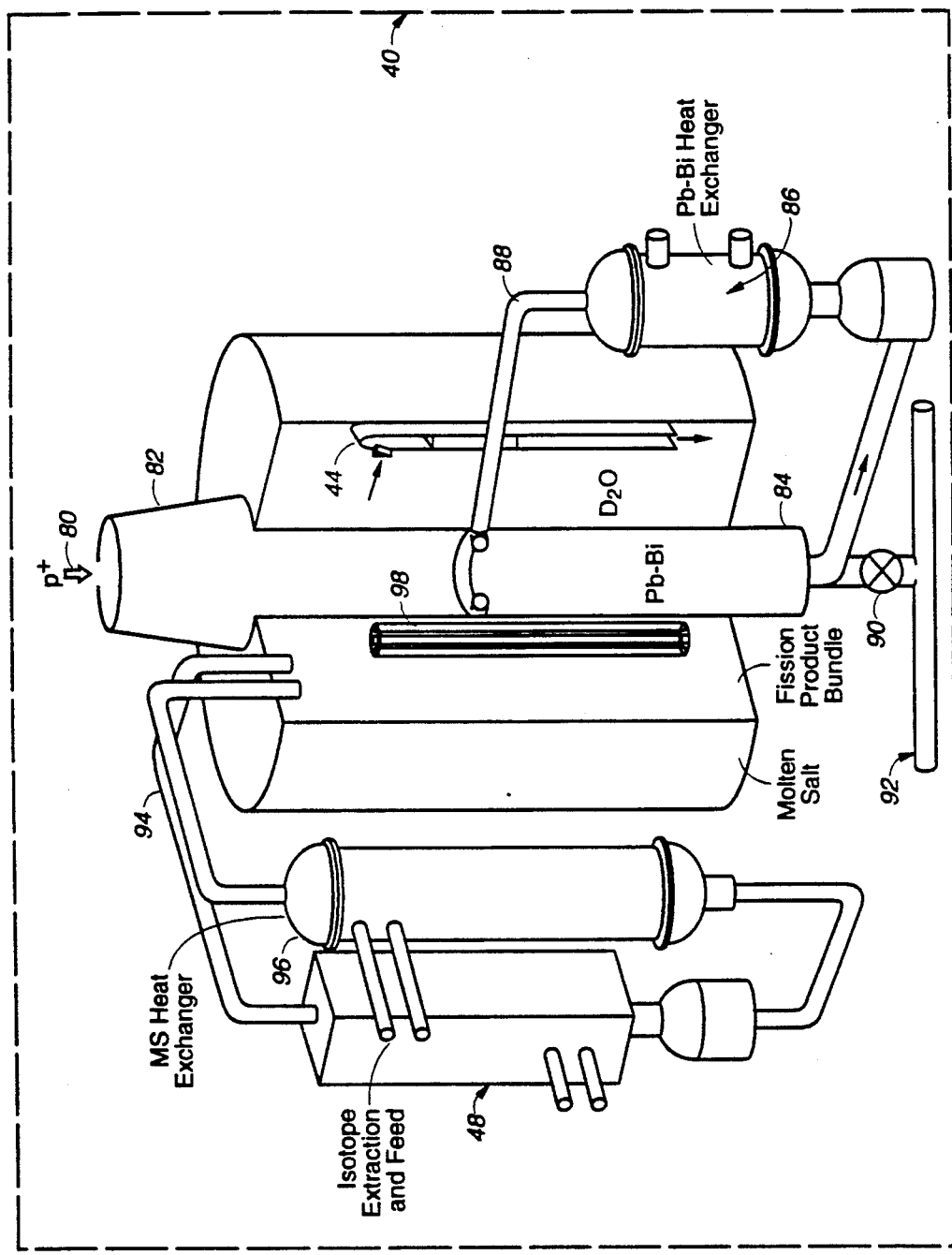
FIG. 4 is a schematic representation of the accelerator-based, high neutron flux production and reaction volume of the present invention.

Energy Production Using Fertile Fuels:

The increase in neutrons per fission associated with the introduction of the accelerator and spallation target according to the teachings of the present invention opens the possibility for fission energy production from the fertile materials $^{232}$Th and $^{238}$U while also burning the actinide and fission product waste. The important details of the reactor apparatus 40 shown in FIG. 2 hereof which accomplish this purpose are illustrated in FIG. 4. Proton beam 80 enters a windowless beam drift tube 82 which makes a substantially vacuum tight seal with enclosure 84 which is part of a heat exchanger 86/recirculating loop 88 for removing heat from the liquid-metal spallation target. At the high proton beam intensities contemplated for practising the present invention it is essential that windows be eliminated from the proton delivery system. Drift tube 82 is cooled and pumped (apparatus not illustrated) in order to maintain the high vacuum conditions required for generation and transmission of protons. Shown is a lead-bismuth eutectic mixture liquid-metal spallation target. Also illustrated is normally-closed valve 90 which drains enclosure 84 and heat exchanger/recirculating loop 86,88 into reservoir 92 in the event that a predetermined condition occurs. It should be mentioned at this point that the spallation products formed in the target eventually are substantially transmuted back toward lead in the high neutron flux environment. Neutrons emerging from enclosure 84 are moderated by moderator 44 for which heavy water is suitable. Molten salt recirculation loop 94 contains the fertile or fissile materials and fission products thereof, and perhaps a tritium precursor, if tritium is to be generated. Heat exchanger 96 removes heat from loop 94 and together with heat exchanger 86 may be used to power heat exchanger/electric power generation means 50 shown in FIG. 2 hereof. As will be discussed below, fission products are separated from recirculation loop 94 by processor 48 also shown in FIG. 2 hereof. After further separation of the stable and short-half-life species, waste materials to be transmuted are inserted into containment means 98 for further irradiation. Containment means 98 are located closer to the liquid-metal target enclosure 84 in order to take advantage of the somewhat higher neutron flux found in the vicinity thereof. A proposed composition for the molten salt eutectic might be a ratio of 52% by molecular weight of $^7$LiF to 48% of BeF$_2$ for the transport of dissolved fluorine salts of the actinides or of fission products into and out of the recirculation loop. An alternative composition might be 27% UF$_4$ and 73% $^7$LiF. Another function of processor 48 is to maintain the ion/fluoride balance in the recirculation loop. The overall efficiency for energy production depends upon the fraction of the electricity generated which must be returned to the accelerator to supplement the neutron economy. This efficiency is therefore significantly improved by taking advantage of the high thermal-to-electric conversion efficiency of 44% possible owing to the high operating temperature of the molten salt, the state-of-the-art accelerator bussbar-to-beam efficiency of 45-50%, the reduction to the degree possible of neutron loss to leakage and capture in the target/blanket components, and the transmutation of as little of the waste as possible consistent with the waste elimination objectives.

The objective in burning the waste is to reduce the time for storage and management of the waste to a time period comparable to the human lifespan. This would be accomplished by continuous removal of the fission products from the molten salt by means of a slip stream. The fission products would be separated into three groups: the stable products, which would only be made radioactive by further irradiation, those which naturally decay to the radioactivity level of uranium ore in about eighty years, and the longer half-lived products. The latter materials would by returned to the blanket in a second molten salt loop dedicated to waste burning. For these fertile fuels there would be no actinide waste stream as usually associated with power production from fissile materials. Product actinides may be left in the molten salt loop where their concentration will grow to an equilibrium concentration in which all actinides heavier than the primary fissile nuclide will be burned as fast as they are produced. This concentration will have negligible impact on the blanket performance.

The operation of the system for $^{232}$Th and $^{238}$U will have one substantial difference. The $^{232}$Th system will require the continuous removal of $^{233}$Pa which is generated following decay of the $^{233}$Th produced by thermal neutron capture of $^{232}$Th. When removed from the neutron flux, this material naturally decays to highly fissile $^{233}$U with a half-life of 27 days. The $^{233}$U is then returned to the molten salt loop where it is burned by the neutron flux to produce nuclear energy. If the $^{233}$Pa is allowed to remain in the neutron flux, it will capture a second neutron and be transmuted to $^{234}$Pa which then decays quickly to $^{234}$U which is not fissile with thermal neutrons. For $^{238}$U, this step of continuous removal might not be required since in a $10^{16}$ n/cm$^2$-s flux, 85% of the $^{239}$U produced by the capture of a first neutron decays to $^{239}$Pu before capture of a second neutron. The percentage can be increased still further by placement of the salt in the outer portions of the blanket where the flux has decreased substantially. The inner portion of the blanket would be devoted principally to fission product burning in the higher flux. The $^{232}$Th overall energy efficiency is substantially higher than that for $^{238}$U because the capture-to-fission ratio for the product nucleus $^{233}$U is more favorable than that for the corresponding $^{239}$Pu nucleus.

The comparison between established reactor technology and the accelerator-based system is worth noting. The number of neutrons per fission is barely sufficient to make possible practical breeder reactors for either $^{232}$Th or $^{238}$U. It is not practical to burn the waste from a breeder in addition since, as stated, there are no extra neutrons available; any extra neutrons available being expended in the breeding process. Therefore, while burning the full thorium and uranium resource is now practical with breeder reactors, it is not possible to burn their waste to avoid repository storage for long time periods. This is true whether one attempts to burn the waste in the breeder itself or in a separate waste-burner reactor fueled by the excess fissile material bred. In either situation, the excess neutrons per fission are insufficient. However, in the accelerator-target/blanket-turbine system of the present invention, the full uranium and thorium resource can be burned with reasonable efficiency and without a waste stream which must be managed for periods well beyond the human lifespan. The accelerator-based system has the additional advantages that the blanket is subcritical and contains orders of magnitude less actinide material which might be dispersed in the event of an accident.

EXAMPLE II

Burning Commercial Nuclear Waste

Spent reactor fuel elements are placed in pools for long storage periods during which the radioactivity decays to substantially lower levels compared to that when initially removed from the reactor. Burning this waste requires that the fuel be chemically partitioned into the following components:

1. Residual uranium (potential fertile material);
2. Plutonium isotopic mixture (potential fuel);
3. Higher actinides such as $^{237}$Np adn $^{241}$Am, and other fission products having long half-lives;
4. $^{90}$Sr and $^{137}$Cs; and
5. Stable and short-lived fission products.

The most difficult materials to burn are the $^{90}$Sr and $^{137}$Cs since these materials have the smallest cross sections. They must be burned in a flux of at least $1 \times 10^{16}$ n/cm$^2$-s if the destruction rate is to substantially exceed that of the natural decay associated with their 30-year half-lives. Since these materials also constitute a large part of the fission product waste, there is much to gain from allowing the material to decay for a sixty year period, for example, in order to reduce the amount of material which must be transmuted to about one-fourth of its original value. At that point, the remaining material would be cycled through the high neutron flux followed by chemical separation, and then repeatedly recycled for a period of about ten years until the material is reduced to the desired level of radioactivity.

The higher actinide mixture burns readily by the two-step process of the present invention in an intense flux of neutrons with a net supplement to the neutron economy rather than a depletion. Since the short-lived and stable fission products need not be burned, the latter potentially being made radioactive by further irradiation, the remaining group, referred to as other fission products having long half-lives, which constitutes the largest component of the waste to be burned, needs attention. In almost all situations, this material is converted to stable or short-lived materials with the capture of a single neutron. In order to supplement the neutrons produced by the accelerator, it is helpful to also burn some of the plutonium isotopic mixture. With this approach to waste burning, managed transmutation and storage over a period comparable to the human lifespan will result in a reduction of the radioactivity of the waste to a level comparable to the radioactivity of the original uranium ore. By supplementing the accelerator-produced neutrons with the neutrons from plutonium burning, the waste from about ten commercial power reactors can be burned with one target/blanket operating at the same thermal power as the reactor, while providing all electric power from the system which is required to power the accelerator.

The plutonium mixture and the higher actinide waste would be burned in a primary molten salt loop with continuous removal of the fission products. The fission products requiring further transmutation would be burned in a second loop located in the region of the most intense neutron flux, as described hereinabove, after being separated into the three fission product groups.

EXAMPLE III

Burning Defense Nuclear Waste

High-level defense waste includes fission products waste and higher actinide waste which is dominated by $^{237}$Np. The waste has in almost all situations been chemically processed and stored. In order to burn such waste it must be retrieved from the storage tanks and chemically processed into fluoride or other salts in order that it be introduced into the molten salt loop of the present invention dedicated to waste burning. Both types of waste may be burned simultaneously in whatever ratio appears to be appropriate except that the fission product waste should be in a waste burning loop and the actinide waste should be in a primary fuel loop.

Any of the four fuels listed hereinbelow in Example IV or a combination thereof may be used. For maximum effectiveness, all electric power generated in the system would be fed to the accelerator. Of course, the system could be operated with all power coming from external sources. The waste material in the fission product loop which has been transmuted to stable or short-lived material would be removed continually using a slip stream. Fission products would be removed from the fuel loop and after appropriate chemical separations, returned to the fission product loop as set forth in Example I. By high purity chemical separations and recycling, the radioactivity level of the waste could be reduced to a level below that of the original uranium ore.

EXAMPLE IV

Tritium Production

An accelerator-based system for tritium production can be constructed which generates its own electric power and which burns its own waste so that waste management is necessary only over a time comparable to a human lifespan. In this situation, the tritium is produced by transmutation of $^6$Li by a (n,A) reaction to an alpha particle and a tritium nucleus. The $^6$Li is present in the molten salt mixture as LiF. The produced tritium is carried in the molten salt as tritium fluoride and is removed continuously by use of a slip stream in the molten salt system. Such a system could be fueled with 1. separated $^{235}$U, 2. with any excess $^{239}$Pu available in the defense program, 3. with higher actinide waste existing in the defense program, or 4. with the fertile materials $^{232}$Th and $^{238}$U. Of course, any combination of these four is also possible. If fertile materials are present, the fuel management program described in Example I must be employed.

The efficiency of production per fission decreases in the order of the four fuel materials listed above. To obtain the maximum tritium production rate, all of the electric power generated would be fed back into the accelerator for any of the fueling options. The third option has the advantage that tritium could be produced using defense actinide waste as fuel. The difference in the fourth option and power production from the uranium and thorium resource as described in Example I is that the fraction of the neutrons expended in producing the fission energy which is fed into the power line is instead used for conversion of the $^6$Li to tritium.

The accelerator-based approach of the present invention for tritium production may be compared with production using a reactor fueled with $^{235}$U, which has been the method of choice in the past and is planned for the future. With the accelerator, the system would be operated far below criticality, there is no long-term waste stream, and the inventory of fission products and actinide is lower by several orders of magnitude in case of an accident. The accelerator-driven process of the present invention has the additional advantage that it can be fueled by four methods, one of which allows the elimination of an important component of the defense waste, and another which avoids burning of the two fissile materials $^{235}$U and $^{239}$Pu.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What I claim is:

1. An apparatus for producing power from fertile nuclear materials and transmuting wastes therefrom to less radioactive species, said apparatus comprising in combination:
   a. means for generating a high intensity, high-energy beam of protons;
   b. a liquid-metal spallation target having an upwardly facing open surface for producing a high neutron flux upon being impacted by high-energy protons;
   c. a substantially gas-tight enclosure surrounding said spallation target;
   d. windowless means for directing the beam of protons onto the open surface of said spallation target;
   e. neutron moderation means for thermalizing neutrons generated from said spallation target;
   f. first means for containing the fertile nuclear material disposed within said neutron moderation means and spaced apart from and outside of said spallation target;
   g. second means for containing materials to be transmuted disposed within said neutron moderation means and spaced apart and outside of said spallation target, yet closer thereto than said first containment means;
   h. first flowing means for passing the fertile nuclear material and transmutation products thereof through said first containment means;
   i. means for combining the fertile nuclear material with a molten salt eutectic and causing the combination formed thereby to flow through said first flowing means; and
   j. means for extracting fission products from the molten salt eutectic flowing through said first flowing means, separating the stable and short-lived fission products therefrom, and introducing the remaining material into said second containment means for transmutation.

2. The apparatus as described in claim 1, wherein the fertile nuclear materials are selected from the group consisting of $^{238}$U, $^{232}$Th, and mixtures thereof.

3. The apparatus as described in claim 1, wherein said spallation target includes high-Z material for production of neutrons by interaction with the high-energy beam of protons.

4. The apparatus as described in claim 3, wherein said liquid-metal spallation target includes a lead-bismuth eutectic mixture.

5. The apparatus as described in claim 4, further comprising first heat exchanger means through which the liquefied lead-bismuth eutectic is circulated in order to remove generated heat.

6. The apparatus as described in claim 1, wherein said high intensity, high-energy proton beam generation means provides protons having energies between 400 MeV and 10 GeV with an average proton beam current of greater than 10 ma.

7. The apparatus as described in claim 1, wherein said neutron moderation means includes heavy water.

8. The apparatus as described in claim 1, wherein said high intensity, high-energy proton beam generation means, said spallation target, and said neutron moderation means produce a thermal neutron flux sufficient to permit substantial two-neutron transmutation processes to occur in waste products resulting from producing power from the fertile nuclear material.

9. The apparatus as described in claim 1, further comprising second heat exchanger means for removing heat from the flowing molten salt eutectic and fertile nuclear material combination after the combination passes through said neutron moderation means.

10. The apparatus as described in claim 9, further comprising power generation means for generating electricity from heat removed by either or both of said first heat exchanger means and said second heat exchanger means, and for returning a portion of the electricity to said high intensity, high-energy proton beam generation means.

11. The apparatus as described in claim 1, wherein said windowless means for directing the high intensity, high-energy proton beam into said spallation target means includes a cooled, evacuated beam transport tube having one end thereof forming a substantially gas-tight seal to said gas-tight enclosure and disposed substantially vertically above said spallation target, the other end thereof forming a substantially gas-tight seal with said proton beam generating means; whereby volatile gases produced within said spallation target means may be removed from the vicinity of the high intensity, high-energy proton beam, and whereby the high intensity, high-energy proton beam may be directed substantially vertically and directly onto the open surface of said liquid-metal spallation target.

12. The apparatus as described in claim 5, wherein said gas-tight enclosure further comprises a convection air-cooled holding tank located below said first heat exchanger means into which the liquid-metal may drain, and normally-closed valve means responsive to a chosen operating condition demanding that said valve means be opened, thereby permitting the liquid metal to drain out of said first heat exchanger means and out of the region of said spallation target.

13. The apparatus as described in claim 1, further comprising means for sensing and maintaining the ion-/fluoride valence balance in the molten salt eutectic.

14. The apparatus as described in claim 1, further comprising means for continuously removing $^{233}$Pa from the molten salt eutectic flowing through said flowing means in the event $^{232}$Th is utilized as a fertile material.

15. The apparatus as described in claim 1, further comprising second flowing means for passing the fission products through said second containment means.

16. An apparatus for producing power from fissile nuclear materials without necessity for long-term nuclear waste management, said apparatus comprising in combination:
   a. means for generating a high intensity, high-energy beam of protons;
   b. a liquid-metal spallation target having an upwardly facing open surface for producing a high neutron flux upon being impacted by high-energy protons;
   c. a substantially gas-tight enclosure surrounding said spallation target;
   d. windowless means for directing the beam of protons onto the open surface of said spallation target;

e. neutron moderation means for thermalizing neutrons generated from said spallation target;

f. first means for containing the fissile nuclear materials disposed within said neutron moderation means and spaced apart from and outside of said spallation target;

g. second means for containing material to be transmuted disposed within said neutron moderation means and spaced apart and outside of said spallation target, yet closer thereto than said first containment means;

h. first flowing means for passing the fissile nuclear material and transmutation products thereof through said first containment means;

i. means for combining the fissile nuclear material with a molten salt eutectic and causing the combination formed thereby to flow through said first flowing means; and j. means for extracting fission products from the molten salt eutectic flowing through said first flowing means, separating the stable and short-lived fission products therefrom, and introducing the remaining material into said second containment means for transmutation.

17. The apparatus as described in claim 16, wherein the fissile nuclear materials are selected from the group consisting of $^{235}U$, $^{239}Pu$, and mixtures thereof.

18. The apparatus as described in claim 16, wherein said spallation target includes high-Z material for production of neutrons by interation with the high-energy beam of protons.

19. The apparatus as described in claim 18, wherein said liquid-metal spallation target includes a lead-bismuth eutectic mixture.

20. The apparatus as described in claim 19, further comprising first heat exchanger means through which the liquefied lead-bismuth eutectic is circulated in order to remove generated heat.

21. The apparatus as described in claim 16, wherein said high intensity, high-energy proton beam generation means provides protons having energies between 400 MeV and 10 GeV with an average proton beam current of greater than 10 ma.

22. The apparatus as described in claim 16, wherein said neutron moderation means includes heavy water.

23. The apparatus as described in claim 16, wherein said high intensity, high-energy proton beam generation means, said spallation target, and said neutron moderation means produce a thermal neutron flux sufficient to permit substantial two-neutron transmutation processes to occur in waste products resulting from producing power from the fissile nuclear material.

24. The apparatus as described in claim 16, further comprising second heat exchanger means for removing heat from the flowing molten salt eutectic and fissile nuclear material combination after the combination passes through said neutron moderation means.

25. The apparatus as described in claim 24, further comprising power generation means for generating electricity from heat removed by either or both of said first heat exchanger means and said second heat exchanger means, and for returning a portion of the electricity to said high intensity, high-energy proton beam generation means.

26. The apparatus as described in claim 16, wherein said windowless means for directing the high intensity, high-energy proton beam into said spallation target means includes a cooled, evacuated beam transport tube having one end thereof forming a substantially gas-tight seal to said gas-tight enclosure and disposed substantially vertically above said spallation target, the other end thereof forming a substantially gas-tight seal with said proton beam generating means; whereby volatile gases produced within said spallation target means may be removed from the vicinity of the high intensity, high-energy proton beam, and whereby the high intensity, high-energy proton beam may be directed substantially vertically and directly onto the open surface of said liquid-metal spallation target.

27. The apparatus as described in claim 20, wherein said gas-tight enclosure further comprises a convection air-cooled holding tank located below said first heat exchanger means into which the liquid-metal may drain, and normally-closed valve means responsive to a chosen operating condition demanding that said valve means be opened, thereby permitting the liquid metal to drain out of said first heat exchanger means and out of the region of said spallation target.

28. The apparatus as described in claim 16, further comprising means for sensing and maintaining the ion-/fluoride valence balance in the molten salt eutectic.

29. The apparatus as described in claim 16, wherein said first fissile nuclear material containment means contains a sub-critical inventory of fissile material.

30. The apparatus as described in claim 1, further comprising second flowing means for passing the fission products through said second containment means.

31. An apparatus for transmuting higher actinide waste along with $^{99}Tc$, $^{129}I$, and other fission product waste, thereby eliminating necessity for long-term nuclear waste storage, said apparatus comprising in combination:

a. means for generating a high intensity, high-energy beam of protons;

b. a liquid-metal spallation target having an upwardly facing open surface for producing a high neutron flux upon being impacted by high-energy protons;

c. a substantially gas-tight enclosure surrounding said spallation target;

d. windowless means for directing the beam of protons onto the open surface of said spallation target;

e. neutron moderation means for thermalizing neutrons generated from said spallation target; and f. first means for containing the material to be transmuted disposed within said neutron moderation means and spaced apart from and outside of said spallation target;

g. second means for containing material to be transmuted disposed within said neutron moderation means and spaced apart and outside of said spallation target, yet closer thereto than said first containment means;

h. first flowing means for passing the material to be transmuted and transmutation products thereof through said first containment means;

i. means for combining the material to be transmuted with a molten salt eutectic and causing the combination formed thereby to flow through said first flowing means; and j. means for extracting transmutation products from the molten salt eutectic flowing through said first flowing means, separating the stable and short-lived fission products therefrom, and introducing the remaining material into said second containment means for transmutation.

32. The apparatus as described in claim 31, wherein the higher actinide materials are selected from the group consisting of $^{237}$Np, $^{241}$Am, $^{244}$Cm, and mixtures thereof.

33. The apparatus as described in claim 31, wherein said spallation target includes high-Z material for production of neutrons by interaction with the high-energy beam of protons.

34. The apparatus as described in claim 33, wherein said liquid-metal spallation target includes a lead-bismuth eutectic mixture.

35. The apparatus as described in claim 34, further comprising first heat exchanger means through which the liquefied lead-bismuth eutectic is circulated in order to remove generated heat.

36. The apparatus as described in claim 31, wherein said high intensity, high-energy proton beam generation means provides protons having energies between 400 MeV and 10 GeV with an average proton beam current of greater than 10 ma.

37. The apparatus as described in claim 31, wherein said neutron moderation means includes heavy water.

38. The apparatus as described in claim 31, wherein said high intensity, high-energy proton beam generation means, said spallation target, and said neutron moderation means produce a thermal neutron flux sufficient to permit substantial two-neutron transmutation processes to occur in the material to be transmuted.

39. The apparatus as described in claim 31, further comprising second heat exchanger means for removing heat from the flowing molten salt eutectic and material to be transmuted combination after the combination passes through said neutron moderation means.

40. The apparatus as described in claim 39, further comprising power generation means for generating electricity from heat removed by either or both of said first heat exchanger means and said second heat exchanger means, and for returning a portion of the electricity to said high intensity, high-energy proton beam generation means.

41. The apparatus as described in claim 31, wherein said windowless means for directing the high intensity, high-energy proton beam into said spallation target means includes a cooled, evacuated beam transport tube having one end thereof forming a substantially gas-tight seal to said gas-tight enclosure and disposed substantially vertically above said spallation target, the other end thereof forming a substantially gas-tight seal with said proton beam generating means; whereby volatile gases produced within said spallation target means may be removed from the vicinity of the high intensity, high-energy proton beam, and whereby the high intensity, high-energy proton beam may be directed substantially vertically and directly onto the open surface of said liquid-metal spallation target.

42. The apparatus as described in claim 35, wherein said gas-tight enclosure further comprises a convection air-cooled holding tank located below said first heat exchanger means into which the liquid-metal may drain, and normally-closed valve means responsive to a chosen operating condition demanding that said valve means be opened, thereby permitting the liquid-metal to drain out of said first heat exchanger means and out of the region of said spallation target.

43. The apparatus as described in claim 31, further comprising means for sensing and maintaining the ion-/fluoride valence balance in the molten salt eutectic.

44. The apparatus as described in claim 31, wherein a chosen quantity of $^{239}$Pu is added to the molten salt eutectic to generate sufficient heat to power said proton beam generating means, and to provide additional neutrons, while maintaining sub-criticality.

45. The apparatus as described in claim 31, further comprising second flowing means for passing the fission products through said second containment means.

46. An apparatus for simultaneously transmuting higher actinide materials and producing tritium without necessity for long-term nuclear waste storage, said apparatus comprising in combination:
  a. means for generating a high intensity, high-energy beam of protons;
  b. a liquid-metal spallation target having an upwardly facing open surface for producing a high neutron flux upon being impacted by high-energy protons;
  c. a substantially gas-tight enclosure surrounding said spallation target;
  d. windowless means for directing the beam of protons onto the open surface of said spallation target;
  e. neutron moderation means for thermalizing neutrons generated from said spallation target;
  f. first means for containing the higher actinide materials disposed within said neutron moderation means and spaced apart from and outside of said spallation target; and
  g. means disposed within said neutron moderation means and spaced apart from said spallation target for holding materials which generate tritium upon interaction with neutrons;
  h. second means for containing material to be transmuted disposed within said neutron moderation means and spaced apart and outside of said spallation target, yet closer thereto than said first containment means;
  i. first flowing means for passing the higher actinide materials to be transmuted and transmutation products thereof through said first containment means;
  j. means for combining the higher actinide materials to be transmuted with a molten salt eutectic and causing the combination formed thereby to flow through said first flowing means; and
  k. means for extracting transmutation products from the molten salt eutectic flowing through said first flowing means, separating the stable and short-lived fission products therefrom, and introducing the remaining material into said second containment means for transmutation.

47. The apparatus as described in claim 46, wherein the higher actinide materials are selected from the group consisting of $^{237}$Np, $^{241}$Am, $^{244}$Cm, and mixtures thereof.

48. The apparatus as describe in claim 46, wherein the materials which generate tritium upon interaction with neutrons are selected from the group consisting of $^{3}$He, $^{6}$Li, and mixtures thereof.

49. The apparatus as described in claim 46, wherein said spallation target includes high-Z material for production of neutrons by interation with the high-energy beam of protons.

50. The apparatus as described in claim 49, wherein said liquid-metal spallation target includes a lead-bismuth eutectic mixture.

51. The apparatus as described in claim 50, further comprising first heat exchanger means through which the liquefied lead-bismuth eutectic is circulated in order to remove generated heat.

52. The apparatus as described in claim 46, wherein said high intensity, high-energy proton beam generation means provides protons having energies between 400 MeV and 10 GeV with an average proton beam current of greater than 10 ma.

53. The apparatus as described in claim 46, wherein said neutron moderation means includes heavy water.

54. The apparatus as described in claim 46, wherein said high intensity, high-energy proton beam generation means, said spallation target, and said neutron moderation means produce a thermal neutron flux sufficient to permit substantial two-neutron transmutation processes to occur in the higher actinide materials.

55. The apparatus as described in claim 46, further comprising second heat exchanger means for removing heat from the flowing molten salt eutectic and higher actinide materials combination after the combination passes through said neutron moderation means.

56. The apparatus as described in claim 55, further comprising power generation means for generating electricity from heat removed by either or both of said first heat exchanger means and said second heat exchanger means, and for returning a portion of the electricity to said high intensity, high-energy proton beam generation means.

57. The apparatus as described in claim 46, wherein said windowless means for directing the high intensity, high-energy proton beam into said spallation target means includes a cooled, evacuated beam transport tube having one end thereof forming a substantially gas-tight seal to said gas-tight enclosure and disposed substantially vertically above said spallation target, the other end thereof forming a substantially gas-tight seal with said proton beam generating means; whereby volatile gases produced within said spallation target means may be removed from the vicinity of the high intensity, high-energy proton beam, and whereby the high intensity, high-energy proton beam may be directed substantially vertically and directly onto the open surface of said liquid-metal spallation target.

58. The apparatus as described in claim 51, wherein said gas-tight enclosure further comprises a convection air-cooled holding tank located below said first heat exchanger means into which the liquid-metal may drain, and normally-closed valve means responsive to a chosen operating condition demanding that said valve means be opened, thereby permitting the liquid metal to drain out of said first heat exchanger means and out of the region of said spallation target.

59. The apparatus as described in claim 46, further comprising means for sensing and maintaining the ion/fluoride valence balance in the molten salt eutectic.

60. The apparatus as described in claim 46, wherein sufficient $^{239}$Pu is added to the molten salt eutectic to generate sufficient heat to power said proton beam generating means, and to provide additional neutrons.

* * * * *